(12) United States Patent
Aiba et al.

(10) Patent No.: US 9,959,881 B2
(45) Date of Patent: May 1, 2018

(54) VOICE PROCESSING DEVICE, AUDIO AND VIDEO OUTPUT APPARATUS, COMMUNICATION SYSTEM, AND SOUND PROCESSING METHOD

(71) Applicants: Akihito Aiba, Kanagawa (JP); Minoru Yoshida, Kanagawa (JP)

(72) Inventors: Akihito Aiba, Kanagawa (JP); Minoru Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days. days.

(21) Appl. No.: 15/664,242

(22) Filed: Jul. 31, 2017

(65) Prior Publication Data

US 2018/0040332 A1 Feb. 8, 2018

(51) Int. Cl.
*H04R 3/00* (2006.01)
*G10L 21/02* (2013.01)
*H04R 1/40* (2006.01)
*H04N 7/15* (2006.01)

(52) U.S. Cl.
CPC ........... *G10L 21/0205* (2013.01); *H04N 7/15* (2013.01); *H04R 1/406* (2013.01)

(58) Field of Classification Search
CPC ....... G10L 21/0205; H04N 7/15; H04R 1/406
See application file for complete search history.

(56) References Cited

U.S. PATENT DOCUMENTS

| 2008/0160977 A1* | 7/2008 | Ahmaniemi | H04L 12/1822 455/416 |
| 2015/0098587 A1 | 4/2015 | Aiba et al. | |
| 2016/0064003 A1* | 3/2016 | Mehta | G10L 19/008 381/23 |
| 2016/0295539 A1* | 10/2016 | Atti | H04W 56/0045 |

FOREIGN PATENT DOCUMENTS

| JP | 9-140000 | 5/1997 |
| JP | 2002-091469 | 3/2002 |
| JP | 2007-013400 | 1/2007 |
| JP | 2011-077649 | 4/2011 |

* cited by examiner

*Primary Examiner* — Simon King
(74) *Attorney, Agent, or Firm* — Oblon, McClelland, Maier & Neustadt, L.L.P.

(57) ABSTRACT

A voice processing device includes: a sound pickup to receive sounds respectively from a plurality of locations; and circuitry to: identify, from the plurality of locations, a sound source location at which a sound source exists, as a current sound source location; specify at least one location of the plurality of locations other than the current sound source location, from at least one sound source location that has been identified as the sound source location during a past predetermined time period, as a specified source location at which a sound to be enhanced exists; enhance a sound from the current sound source location, and a sound from the specified source location; and output an audio signal including the enhanced sounds.

13 Claims, 10 Drawing Sheets

VOICE PROCESSING DEVICE, AUDIO AND VIDEO OUTPUT APPARATUS, COMMUNICATION SYSTEM, AND SOUND PROCESSING METHOD

CROSS-REFERENCE TO RELATED APPLICATIONS

This patent application is based on and claims priority pursuant to 35 U.S.C. § 119(a) to Japanese Patent Application No. 2016-152762, filed on Aug. 3, 2016, in the Japan Patent Office, the entire disclosure of which is hereby incorporated by reference herein.

BACKGROUND

Technical Field

The present invention relates to a voice processing device, an audio and video output apparatus, a communication system, and a sound processing method.

Description of the Related Art

A conventional voice processing device includes a location identifier that identifies a sound source location at which a sound source exists from a plurality of locations, and an audio signal output unit that outputs an audio signal in which a sound from the sound source location is enhanced.

For example, the voice processing device identifies a sound source location based on a difference between input times of sounds at a plurality of microphones, and selectively outputs only a sound from the sound source location to enhance that sound.

Such configuration enables a sound from the sound source to be distinguished from noise, and then be output.

However, in a situation in which sound source locations switch from one to another (such as in a discussion held by participants seated in locations different from one another), a sound from a new sound source location will be kept unenhanced until that new sound source location is identified as the sound source location by the location identifier.

Besides, the sound (almost silence) from the location that had been the sound source location until just before the switch is enhanced, and therefore the sound from the actual sound source location becomes unclear.

SUMMARY

Embodiments of the present invention include a voice processing device including: a sound pickup to receive sounds respectively from a plurality of locations; and circuitry to: identify, from the plurality of locations, a sound source location at which a sound source exists, as a current sound source location; specify at least one location of the plurality of locations other than the current sound source location, from at least one sound source location that has been identified as the sound source location during a past predetermined time period, as a specified source location at which a sound to be enhanced exists; enhance a sound from the current sound source location, and a sound from the specified source location; and output an audio signal including the enhanced sounds.

Embodiments of the present invention include a sound pickup to receive sounds respectively from a plurality of locations; and circuitry to: identify, from the plurality of locations, a sound source location at which a sound source exists; and enhance a sound from the identified sound source location to output an audio signal including the enhanced sound. The circuitry discontinues a process of enhancing a sound from the identified sound source location, in accordance with a frequency of switches of the sound source location between two or more of the plurality of locations.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
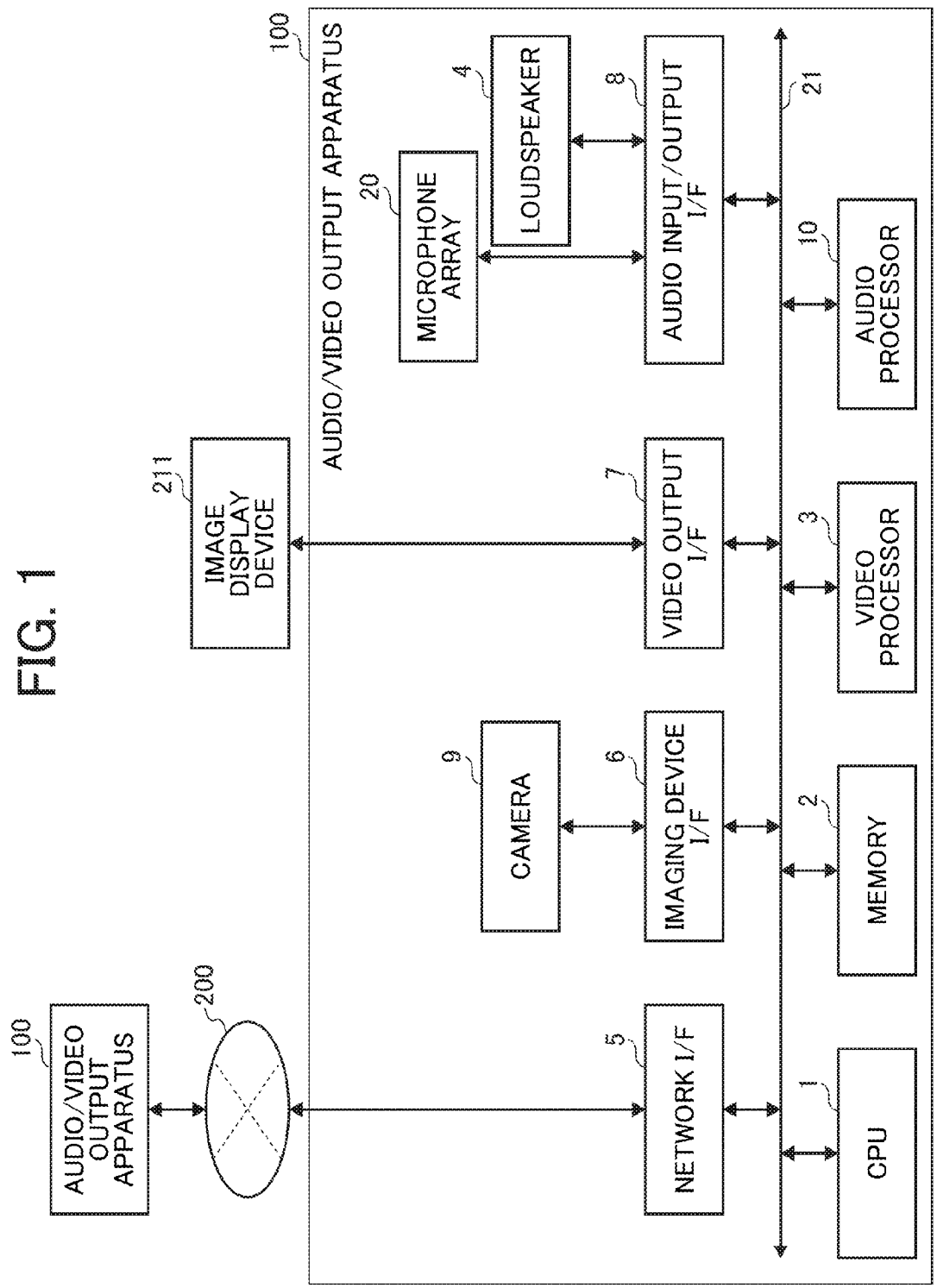
FIG. 1 is a block diagram illustrating an electrical circuit configuration of a teleconference system according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A first embodiment of a communication system in which the present invention is practiced will be described below. In this example, a teleconference system capable of communicating data such as voice data and image data may be used. However, any other type of communication system may be used, as long as the system is capable of inputting voices of meeting participants.

First, the basic configuration of the teleconference system according to the first embodiment will be described.

FIG. 1 is a block diagram illustrating an electrical circuit configuration of the teleconference system according to the first embodiment.

Referring to FIG. 1, the teleconference system includes a plurality of audio/video output apparatuses 100.

The plurality of audio/video output apparatuses 100 can communicate with one another over a network 200 (e.g., the Internet) at locations distant from one another.

Each of the audio/video output apparatuses 100 includes a central processing unit (CPU) 1, a memory 2, a video processor 3, a loudspeaker 4, and a network interface (hereinafter referred to as "network I/F") 5.

The audio/video output apparatus 100 further includes an imaging device interface (hereinafter referred to as "imaging device I/F") 6, a video output interface (hereinafter referred to as "video output I/F") 7, an audio input/output interface (hereinafter referred to as "audio input/output I/F") 8, a camera 9, an audio processor 10, and a microphone array 20. These components are connected to a system bus 21.

The CPU 1 is a computation unit that, for example, performs a process based on a program and data read from the memory 2 to implement various functions of the audio/video output apparatus 100.

The memory 2 is a storage device such as, for example, a random access memory (RAM), a read-only memory (ROM), a hard disk drive (HDD), or a flash memory.

The memory 2 stores a variety of software, numerical data, arithmetic data, image data, and voice data needed for a variety of processing performed by the CPU 1.

The video processor 3 performs a variety of video processing on video data or on a video signal.

The audio processor 10 performs a variety of audio processing on audio data or on an audio signal.

The video processor 3 and the audio processor 10 each include a processor such as a digital signal processor (DSP).

The network I/F 5 communicatively connects a device to the network 200. One example of the network I/F 5 is a network interface card (NIC).

The imaging device I/F 6 receives, as predefined video data, a video signal output from the camera 9 provided for imaging purposes.

The video output I/F 7 transmits a video signal to an image display device 211, such as a liquid crystal display (LCD) monitor or a projector externally installed.

The audio input/output I/F 8 receives, as predefined audio data, an audio signal input via the microphone array 20 provided for voice input.

The audio input/output I/F 8 also converts audio data into an audio signal reproducible by the loudspeaker 4, and then outputs the audio signal.

The microphone array 20 described herein functions as a sound pickup that receives sounds respectively from a plurality of different locations from one another.

The system bus 21 may be an address bus, a data bus, or other similar bus. The system bus 21 enables various control signals to be exchanged between the components described above.

In the teleconference system according to the first embodiment described above, the CPU 1, the memory 2, the microphone array 20, which serves as a sound pickup, the audio input/output I/F 8, the audio processor 10, and other components as needed, together constitute a voice processing device, while the CPU 1, the memory 2, the imaging device I/F 6, the camera 9, the video processor 3, and other components as needed, together constitute a video processing device.

As used herein, of the two places where the two audio/video output apparatuses 100 of FIG. 1 are located, the place of the audio/video output apparatus 100 whose internal circuit configuration is illustrated is referred to as "local meeting room," and the place of the other audio/video output apparatus 100 is referred to as "remote meeting room."

In the audio/video output apparatus 100 in the local meeting room, a video signal obtained by the camera 9 is sent through the imaging device I/F 6 and through the system bus 21 to the video processor 3; and an audio signal obtained by the microphone array 20 is sent through the audio input/output I/F 8 and through the system bus 21 to the audio processor 10.

The CPU 1 transmits an audio signal, sent from the audio/video output apparatus 100 in the remote meeting room, through the system bus 21 to the audio processor 10, and transmits a video signal, sent from the audio/video output apparatus 100 in the remote meeting room, through the system bus 21 to the video processor 3.

The video processor 3 of the audio/video output apparatus 100 in the local meeting room generates a combined video signal, on the basis of the video signal obtained by the camera 9 serving as an imaging unit, and of the video signal sent from the audio/video output apparatus 100 in the remote meeting room.

More specifically, this combined video signal is used to display a composite image formed of a larger image based on the video signal from the remote meeting room and of a smaller image based on the video signal obtained by the camera 9, where the smaller image is framed, and overlaps the larger image.

This combined video signal is transmitted through the system bus 21 and through the video output I/F 7 to the image display device 211.

Thus, the image display device 211 can display a combined video image as described below.

The audio processor 10 of the audio/video output apparatus 100 in the local meeting room generates a combined audio signal combining the audio signal obtained by the microphone array 20 serving as a sound pickup and the audio signal sent from the audio/video output apparatus 100 in the remote meeting room.

This combined audio signal is transmitted through the system bus 21 and through the audio input/output I/F 8 to the loudspeaker 4.

Thus, the loudspeaker 4 can output both a voice of a meeting participant in the remote meeting room and a voice of a meeting participant in the local meeting room.

The audio/video output apparatus 100 in the remote meeting room also performs similar processing to the processing performed by the audio/video output apparatus 100 in the local meeting room described above.

Thus, the meeting participants in the local meeting room can hold a discussion with the meeting participants in the remote meeting room while watching a video image of the meeting participants in the remote meeting room displayed on the image display device 211.

Similarly, the meeting participants in the remote meeting room can hold a discussion with the meeting participants in the local meeting room while watching a video image of the meeting participants in the local meeting room displayed on an image display device provided in the remote meeting room.

The microphone array 20 includes a plurality of microphones having different directivity from one another, and can therefore individually and selectively capture sounds respectively from a plurality of different locations from one another around the audio/video output apparatus 100.

The microphone array 20 can thus individually output audio signals captured by the respective microphones.

A set of such audio signals is hereinafter referred to collectively as "array audio signal."

Figure 2:
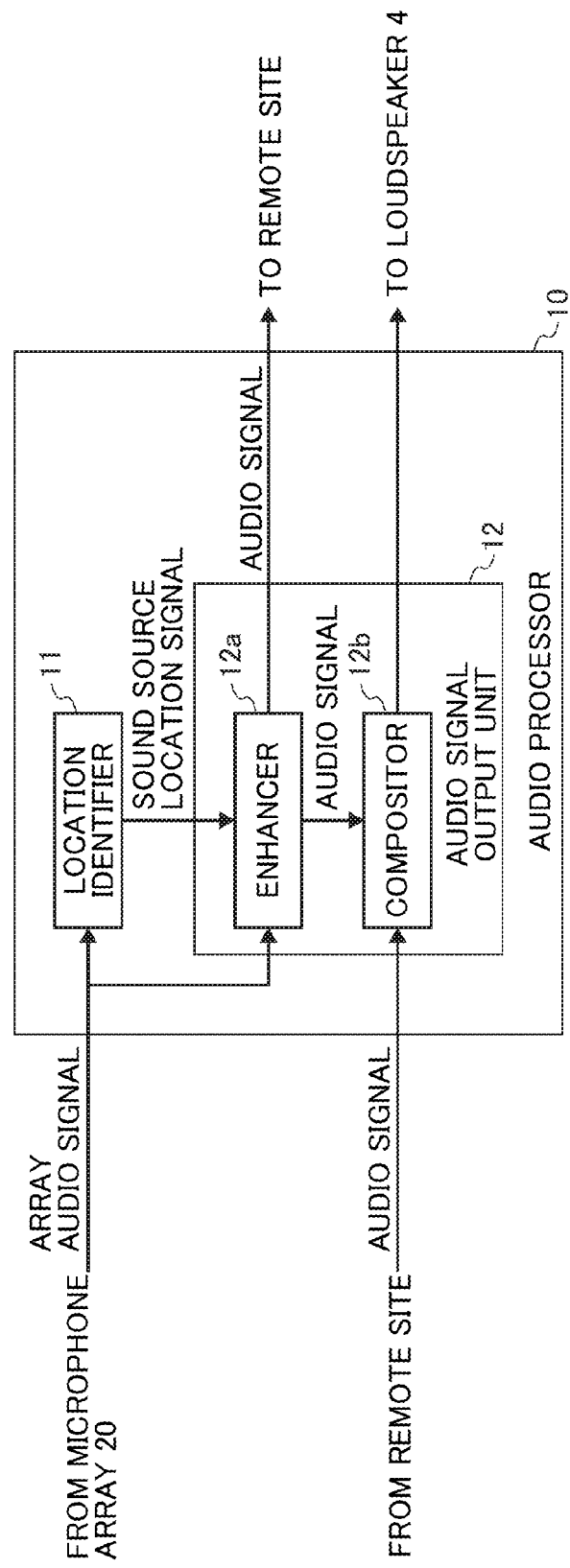
FIG. 2 is a block diagram illustrating an internal configuration of the audio processor in the audio/video output apparatus of the teleconference system of FIG. 1.

FIG. 2 is a block diagram illustrating an internal configuration of the audio processor 10.

The audio processor 10 includes a location identifier 11 and an audio signal output unit 12.

The audio signal output unit 12 includes an enhancer 12a and a compositor 12b.

Referring to FIG. 2, an audio signal from the remote meeting room is input to the compositor 12b, while an array audio signal received by the microphone array 20 in the local meeting room is input to both the location identifier 11 and the enhancer 12a in parallel.

The location identifier 11 identifies an audio signal having a highest sound intensity as the sound source audio signal from a plurality of audio signals included in the array audio signal.

The location identifier 11 then outputs, as a sound source location signal, an informative signal that indicates a microphone corresponding to that sound source audio signal among the plurality of microphones included in the microphone array 20, to the enhancer 12a.

That is, the location identifier 11 functions to identify the sound source location, at which the sound source exists, among the plurality of different locations from one another.

The enhancer 12a enhances, based on the plurality of audio signals included in the array audio signal, a sound corresponding to the sound source location signal sent from the location identifier 11 among the sounds reproduced from the plurality of audio signals, relative to sounds not corresponding to the sound source location signal, and thus an audio signal is generated.

The enhancer 12a then outputs the audio signal to the compositor 12b, and also sends the audio signal through the system bus 21 and through other appropriate components to the audio/video output apparatus 100 in the remote meeting room.

The compositor 12b combines the audio signal from the remote meeting room and the audio signal from the enhancer 12a to generate a combined audio signal, and outputs the combined audio signal through the system bus 21 and through other appropriate components to the loudspeaker 4.

Such configuration can enhance the sound from the sound source location at which the talker exists, among the plurality of locations around the audio/video output apparatus 100, relative to sounds from non-sound source locations at which no talkers exist, in the local meeting room.

Thus, a clear voice of the talker, free from noise originating from non-sound source locations, can be output to the loudspeaker 4 and to the audio/video output apparatus 100 in the remote meeting room.

However, a disadvantage is that when the talkers switch from one to another, the voice of the new talker is not output at a sufficient level, and thus becomes unclear, immediately after the switch between the talkers.

Figure 3:
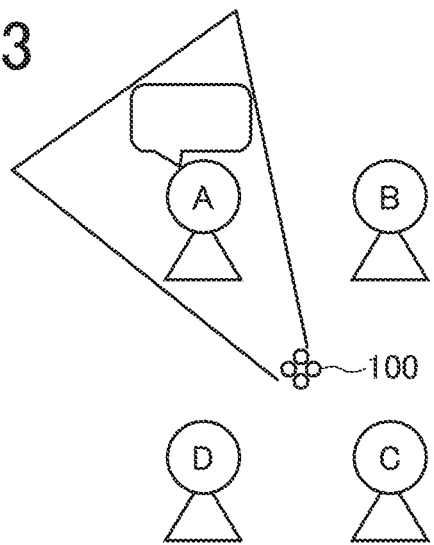
FIG. 3 is a schematic diagram illustrating a situation of a local meeting room in which the location identifier correctly identifies the talker's location as the sound source location.

FIG. 3 is a schematic diagram illustrating a situation of the local meeting room in which the location identifier 11 correctly identifies the talker's location as the sound source location.

In FIG. 3, the area enclosed by the triangle represents the target area of the sound enhancement.

In this example, person A is speaking. The location identifier 11 of the audio/video output apparatus 100 correctly identifies the location of person A as the sound source location, and the location of person A is thus properly selected as the target of the sound enhancement.

Figure 4:
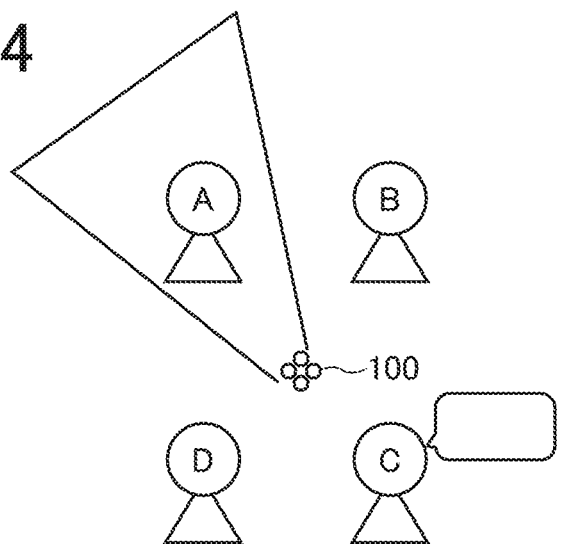
FIG. 4 is a schematic diagram illustrating a situation of the local meeting room in which the talker has just switched from person A to person C, and the location of person C is not correctly identified as the sound source location.

FIG. 4 is a schematic diagram illustrating a situation of the local meeting room immediately after the talkers switched from person A to person C.

Referring to FIG. 4, person C is speaking instead of person A, who has already finished speaking.

Thus, even though the current sound source location is the location of person C, the location identifier 11 incorrectly identifies the location of person A, who has just finished speaking, as the sound source location, and moreover, incorrectly identifies the location of person C as a non-sound source location at which no talkers exist.

Accordingly, the enhancer 12a treats the location of person A, who is no longer the talker, as the target of the sound enhancement, and on the other hand, does not treat the location of person C, who is now the talker, as the target of the sound enhancement.

Outputting an audio signal including noise from the location of person A enhanced relative to the voice of person C, who is the talker, makes unclear the voice of person C, who is the talker.

That is, the voice from the new sound source location will be unclear until the location identifier 11 correctly identifies the sound source location after a switch between talkers, as the sound source location.

A configuration of the teleconference system according to the first embodiment will next be described.

The enhancer 12a of the teleconference system according to the first embodiment identifies the location(s) that is/are recorded as the sound source location in a past predetermined time period, each as an enhancement non-sound source location, from the plurality of locations respectively corresponding to the plurality of microphones of the microphone array 20. For the descriptive purposes, such location, which is not the current sound source, but selected as the location to be recorded, is referred to as an enhancement non-sound source location in this embodiment.

Sound from an enhancement non-sound source location as defined above is enhanced irrespective of the result of sound source location identification performed by the location identifier 11.

More specifically, sound from an enhancement non-sound source location is enhanced even if that location has not been identified as the sound source location by the location identifier 11. The sound source location at which the sound source exists, which is identified with the location identifier 11, may be referred to as the current sound source location.

Figure 5:
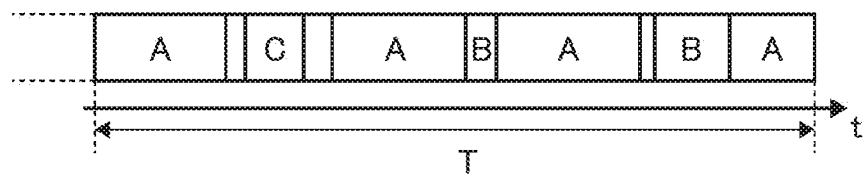
FIG. 5 is a schematic diagram for explaining an example of talkers' history and talk time sections during a look-back period T.

FIG. 5 is a schematic diagram for explaining an example of talkers' history and talk time sections during a look-back period T.

In FIG. 5, the time progresses in the direction of arrow t.

The look-back period T begins at the present time, and extends back for a predetermined time period from the present time.

In this example, any one of the predetermined time periods, such as the past predetermined time period or the look-back period T, may be determined according to, for example, the previously obtained experimental data, any configuration value that is set by a designer or a user, or any value that can be determined based on a conference time or a number of meeting participants.

The time sections indicated by the letters A, B, and C in FIG. 5 indicate that person A, person B, and person C respectively had a speech during those time sections.

A time section having no reference character indicates that no one had a speech in that time section.

The example illustrated in FIG. 5 shows that three locations have each been the sound source location during the look-back period T. These three locations are: the location of person A (hereinafter referred to as "location A"), the location of person B (hereinafter referred to as "location B"), and the location of person C (hereinafter referred to as "location C").

In this case, the enhancer 12a performs the following processing on each of location A, location B, and location C.

That is, even if the location identifier 11 does not currently identify these locations as the sound source location (i.e., has not sent sound source location signals respectively corresponding to these locations), the location identifier 11 enhances (amplifies) audio signals for these locations at a substantially same ratio as the ratio used for the sound from the location identified as the sound source location, and outputs the resultant audio signals.

Figure 6:
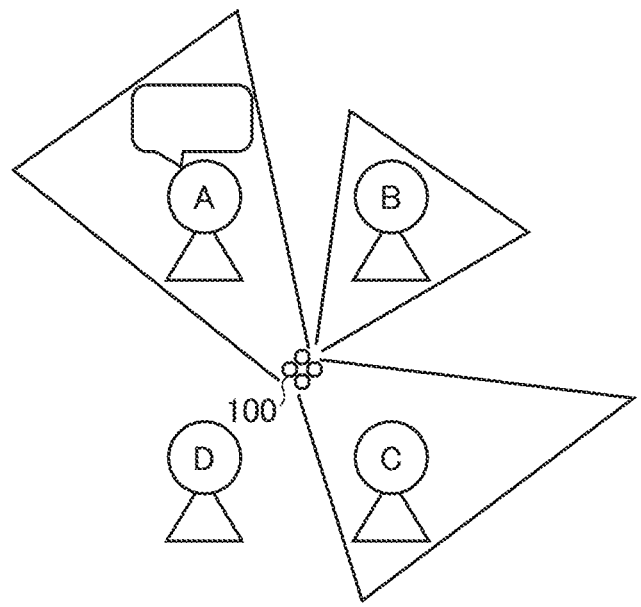
FIG. 6 is a schematic diagram for explaining a relationship between an enhancement non-sound source location and the sound source location identified by the audio/video output apparatus of the teleconference system according to the first embodiment.

For example, as illustrated in FIG. 6, even when only person A is speaking, not only the sound from location A, but also the sounds from location B and location C are enhanced.

Such configuration ensures that the voices from location A, location B, and location C are enhanced and then output even immediately after a switch from a non-sound source location to the sound source location.

Thus, prevention of occurrence of unclear voices of person A, person B, and person C immediately after the beginning of speech can prevent the voice of a person having just begun to speak from being unclear.

In addition, prevention of enhancement of noise from a location different from the three locations described above can reduce the level of noise added to the voice of the talker.

Although the example above has been described as having a configuration that identifies the sound source location based on audio signals respectively sent from the plurality of microphones of the microphone array 20, the sound source location may be identified using other configuration.

For example, face recognition may be performed using a known technology based on video signals generated by the camera 9 to recognize a plurality of persons and the locations of these persons in the local meeting room, and among these persons, the location of a face with a mouth in active movement (i.e., talker) may be identified as the sound source location.

In such case, the location identifier 11 can output a sound source location signal that, for example, indicates the angle of the sound source location around the audio/video output apparatus 100 with respect to a reference angle of a predetermined location defined as 0.

In addition, if the microphone array 20 is provided and used as the sound pickup, the enhancer 12a may be configured such that, among the plurality of microphones included in the microphone array 20, the audio signal from a microphone corresponding to the angle described above is identified as the audio signal from the sound source location.

The example above has been described in which, among the audio signals respectively sent from the plurality of microphones of the microphone array, audio signals from particular microphones are enhanced relative to the other audio signals.

However, a sound pickup may be used that includes a plurality of variably directional microphones capable of changing sound collection directivity, and the enhancer 12a may then be configured such that directing the sound collection directivity of these variably directional microphones to the sound source location or to a location that has been the sound source location causes the sound from such location to be enhanced.

When more than one person are simultaneously speaking, the plurality of locations respectively corresponding to these persons may each be identified as the sound source location, or only the location of the person speaking with the highest voice intensity may be identified as the sound source location.

Table 1 below shows relationships between the location, the number of simultaneous talkers, and the sound source location signal(s) output from the location identifier 11.

TABLE 1

| Number of Simultaneous Talkers | Location A | Location B | Location C | Location D | Case Name |
|---|---|---|---|---|---|
| 2 | 30 | — | 210 | — | Case 1 |
| 1 | — | 120 | — | — | Case 2 |
| 2 | — | — | 210 | 330 | Case 3 |
| 0 | — | — | — | — | Case 4 |
| | Sound Source Location Signal [deg] | | | | |

In the examples illustrated in Table 1, the location identifier 11 outputs an informative signal indicating the angle of the location as a sound source location signal.

If location A, location B, location C, or location D is identified as the sound source location, the location identifier 11 outputs a value of 30, 120, 210, or 330 as the sound source informative signal.

In Case 1, person A at location A and person C at location C are simultaneously speaking.

In Case 2, only person B at location B is speaking.

In Case 3, person C at location C and person D at location D are simultaneously speaking.

In Case 4, there are no talkers, in which case the location identifier 11 outputs no sound source location signals.

The location identifier 11 may be configured, when two or more persons are simultaneously speaking as in Case 1 or Case 2, to identify all the locations corresponding to these persons as the sound source location, and to output sound source location signals respectively corresponding to these locations.

Figure 7:
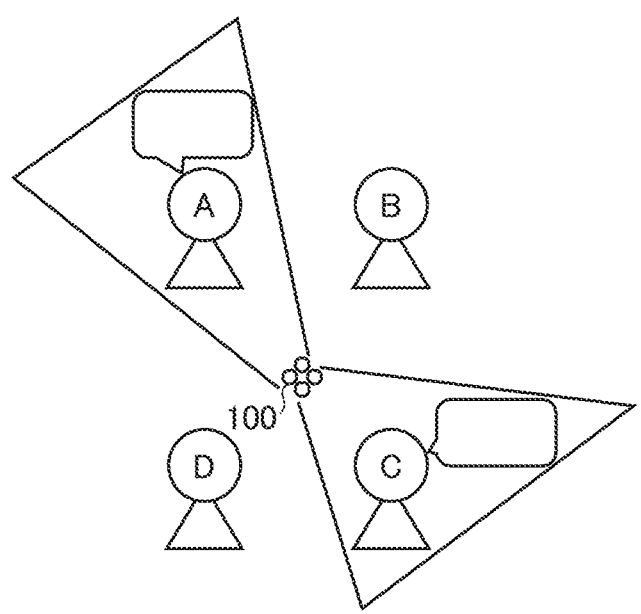
FIG. 7 is a schematic diagram for explaining an example in which when more than one person is simultaneously speaking, the locations of these talkers are each identified as the sound source location.

In such case, in Case 1 for example, the location identifier 11 identifies both the location A of person A, who is speaking, and the location C of person C, who is speaking, as the sound source locations as illustrated in FIG. 7, and outputs two sound source location signals respectively indicating the values of 30 and 120.

Alternatively, the location identifier 11 may also be configured, when two or more persons are simultaneously speaking, to identify only the location of the person of highest sound intensity as the sound source location, and to output a sound source location signal corresponding to that location.

For example, in Case 1, if person A speaks with a higher sound intensity than person C, the location identifier 11 outputs only the value of 30 corresponding to location A as the sound source location signal.

Examples including more characteristic configurations added to the teleconference system according to the first embodiment will next be described.

Unless otherwise indicated, the configuration of the teleconference system according to each of the examples is similar to the configuration of the teleconference system according to the first embodiment.

As used herein, a location not identified as the current sound source location by the location identifier 11, but the sound from which is determined to be enhanced by the enhancer 12a based on the history during the look-back period T, is referred to as an enhancement non-sound source location.

The enhancer 12a of a teleconference system according to a first example selects, from the locations that are each recorded as the sound source location in the look-back period T, only a location or locations satisfying the following condition as enhancement non-sound source location.

The condition of selection is as follows: the number of state changes from a non-sound source location to the sound source location (hereinafter referred to as "number of state changes" Na) during the look-back period T exceeds a threshold, or reaches or exceeds the threshold.

One example of such condition is that the number of state changes Na during the look-back period T is 2 or more.

If this example condition is used in the example of FIG. 5, only the location A and location B will be selected as enhancement non-sound source locations among location A, location B, and location C.

Figure 8:
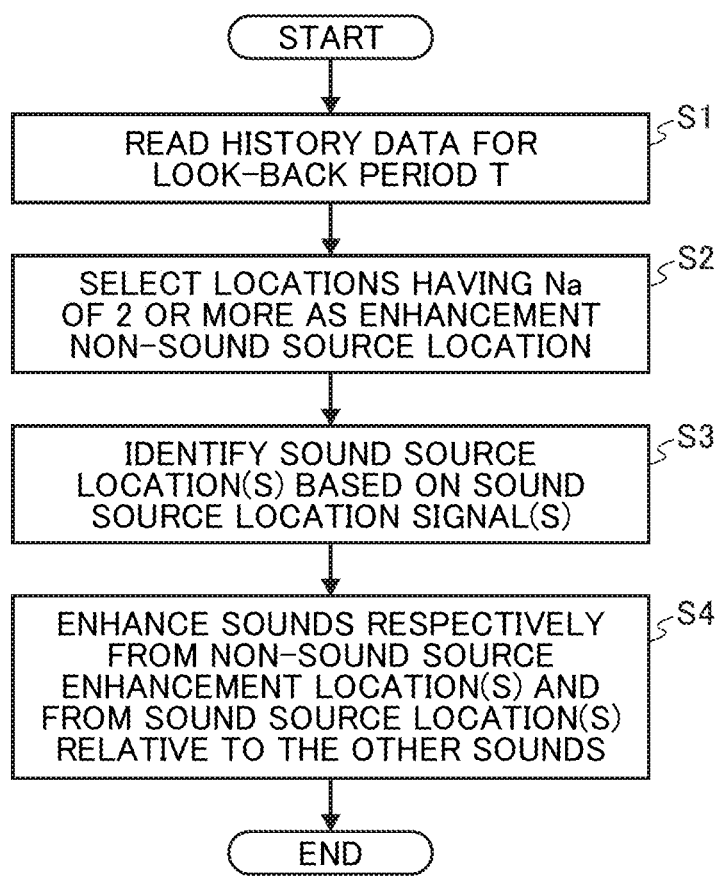
FIG. 8 is a flowchart of a process performed by an enhancer of a teleconference system according to a first example.

FIG. 8 is a flowchart illustrating operation of enhancing sounds, performed by the enhancer 12a of the teleconference system, according to the first example.

The process begins at step S1, in which the enhancer 12a reads history data for the look-back period T stored in any desired memory.

At step S2, all the locations having the number of state changes Na of 2 or more among the plurality of locations that are recorded as the sound source location in the look-back period T are each selected as an enhancement non-sound source location.

At step S3, the current sound source location is identified based on the sound source location signal sent from the location identifier 11. At step S4, the sounds respectively from the enhancement non-sound source location(s) and the sound source location(s) are enhanced relative to the other sounds, and the operation ends. The operation of FIG. 8 is repeated, for example, during teleconferencing.

This process can reduce quality degradation of the output voice caused by enhancing, for a relatively long time period, a low noise originating from a location of an infrequently active talker.

With the aim of preventing increase in noise introduction due to specifying too many enhancement non-sound source locations, a teleconference system according to a second example selects only one enhancement non-sound source location as needed.

If more than one person are simultaneously speaking, only the location of speech having the highest sound intensity is identified as the sound source location.

In the second example, the enhancer 12a of the audio/video output apparatus 100 selects one enhancement non-sound source location based on a record indicating the most recent state change of the sound source location.

More specifically, the enhancer 12a selects, from among the locations that are recorded as the sound source location in the look-back period T, the location corresponding to the most recent record, and other than the current sound source location. Such location, which may be referred to as "most recent recorded location", is a previously identified sound source location that has been identified just before identification of the current sound source location.

The most recent recorded location is identified as the enhancement non-sound source location if the state changes of the sound source location occur only between the most recent recorded location and the current sound source location, and the number of these state changes (hereinafter referred to as "number of alternations" Nb) exceeds a threshold, or reaches or exceeds the threshold.

This is because, in such case, an active discussion is likely to be under way between those two persons, and the current location is likely to be relatively frequently switched.

In the example illustrated in FIG. 5, if the current sound source location is at location A, the most recent recorded location is location B.

Note that a block without a talker (hereinafter referred to as "silent block" or "silent period") exists between the second right block (a time section of person B speaking) and the fourth right block (a time section of person A speaking) in FIG. 5.

If such a silent period has a duration less than a predetermined value, that silent period is ignored, and it is then determined whether the switch between the second right block and the fourth right block is an alternation between the sound source location and the most recent recorded location.

Meanwhile, if the silent period has a duration of a predetermined value or more, it is determined that there is no alternation between the second right block and the fourth right block.

Thus, if this silent period has a duration less than a predetermined value, the number of alternations Nb is 4, while, if this silent period has a duration of a predetermined value or more, the number of alternations Nb is 1.

If the number of alternations Nb exceeds a threshold, or reaches or exceeds the threshold, location B is identified as the enhancement non-sound source location.

Alternatively, if the current sound source location is at location B in the example illustrated in FIG. 5, the most recent recorded location is location A.

In this case, if the silent period has a duration less than the predetermined value, the number of alternations Nb will be 5, while, if the silent period has a duration of the predetermined value or more, the number of alternations Nb will be 2.

Figure 9:
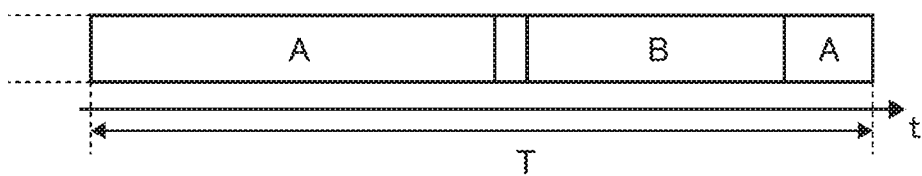
FIG. 9 is a schematic diagram for explaining a second example of talkers' history and talk time sections during the look-back period T.

FIG. 9 is a schematic diagram for explaining a second example of talkers' history and talk time sections during the look-back period T.

In this second example, if the current sound source location is at location A, the most recent recorded location is location B.

In this case, if the silent period (third from right) has a duration less than a predetermined value, the number of alternations Nb is 2, while, if the silent period has a duration of the predetermined value or more, the number of alternations Nb is 1.

Alternatively in the second example, if the current sound source location is at location B, the most recent recorded location is location A.

In this case, if the silent period has a duration less than the predetermined value, the number of alternations Nb will be 3, while, if the silent period has a duration of the predetermined value or more, the number of alternations Nb will be 2.

Figure 10:
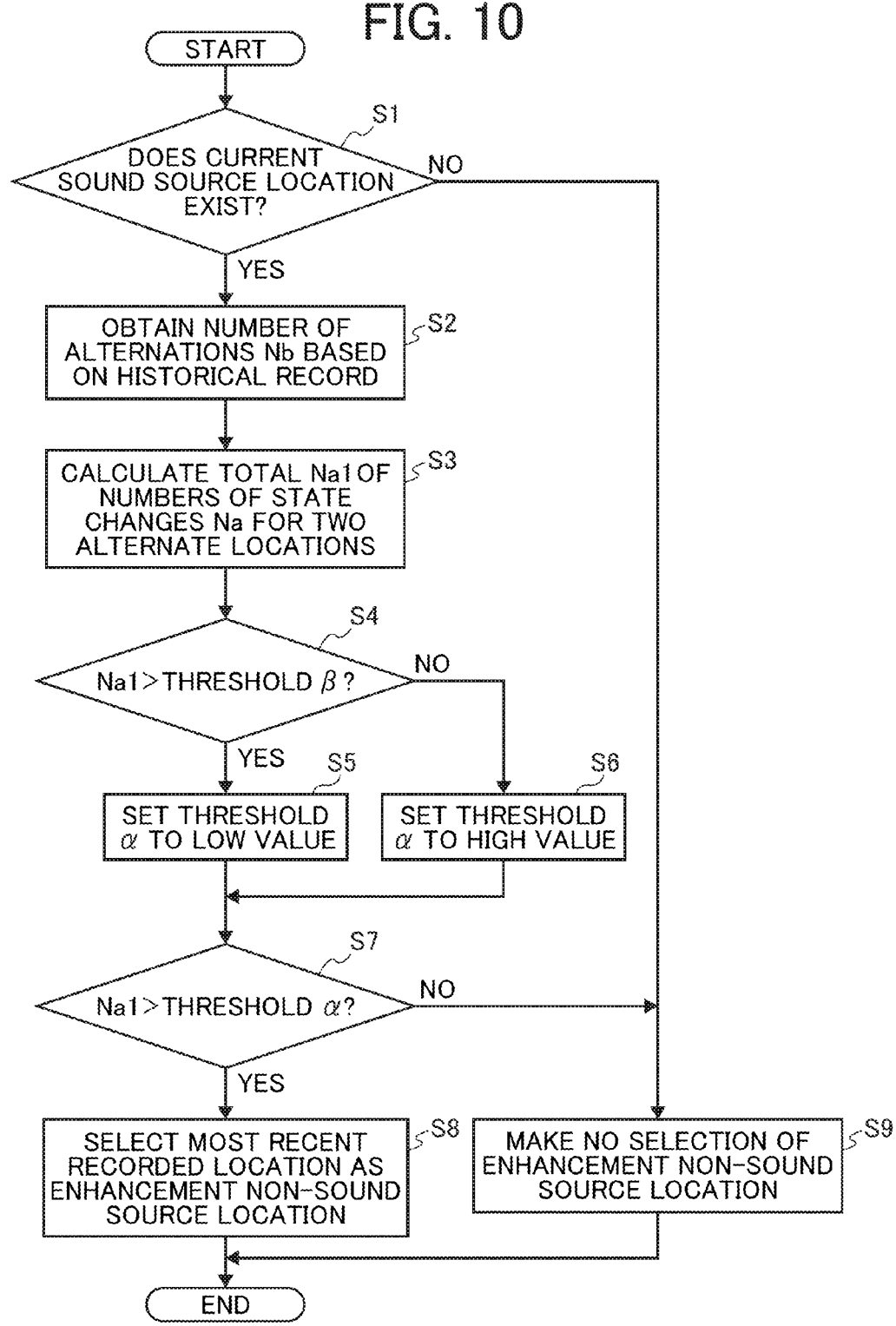
FIG. 10 is a flowchart of an example of a process performed by an enhancer of a teleconference system according to a second example.

FIG. 10 is a flowchart of operation of enhancing sounds, performed by the enhancer 12a of the teleconference system, according to the second example.

Referring to this flowchart, at step S1, the enhancer 12a determines whether a current sound source location exists.

If no current sound source location exists (N at step S1), no selection is made of the enhancement non-sound source location at step S9, and the operation ends, to repeat the operation of FIG. 10, for example, during teleconferencing.

This procedure ensures that sound from none of the plurality of locations is enhanced, and that all the locations have voice levels substantially identical to one another, thereby enabling voice of the next talker to be effectively and beneficially collected.

Meanwhile, if a current sound source location exists (Y at step S1), the enhancer 12a obtains, at step S2, the number of alternations Nb described above on the basis of the historical record.

At step S3, the enhancer 12a calculates a total Na1, which is the total of the number of recorded state changes Na described above for the current sound source location and the number of recorded state changes Na of the most recent recorded location.

Note that the most recent recorded location is defined as the location having most recently been recorded as the sound source location among the locations other than the current sound source location, and is thus different from the current sound source location.

After the calculation of the total Na1, the enhancer 12a determines, at step S4, whether the total Na1 exceeds a threshold β.

If the total Na1 exceeds the threshold β (Y at step S4), a threshold α for later use in comparison with the total Na1 is set to a relatively low value at step S5.

Meanwhile, if the total Na1 does not exceed the threshold β (N at step S4), the threshold α is set to a relatively high value at step S6.

As described above, varying the value of the threshold α enables the threshold α to be set as a relatively low value if the talker frequently state changes over a short time period because of active discussion (Y at step S4), thus facilitating identification of the most recent recorded location as the enhancement non-sound source location.

Thus, unclear voice of a talker in an initial portion of speech can be more effectively reduced or eliminated when the talkers frequently switch from one to the other over a short time period.

In this example, any one of the relatively low value and the relatively high value of the threshold is determined, with respect to the currently-set threshold, for example, based on the previously obtained experimental data, any configuration value that is set by a designer or a user, or any value that can be determined based on information regarding the conference such as a conference duration time or a number of meeting participants.

After setting of the threshold α, the enhancer 12a determines, at step S7, whether the total Na1 exceeds the threshold α.

If the total Na1 exceeds the threshold α (Y at step S7), the most recent recorded location is identified as the enhancement non-sound source location at step S8, and the operation ends to repeat the operation of FIG. 10.

Meanwhile, if the total Na1 is less than or equal to the threshold α (N at step S7), no selection is made of the enhancement non-sound source location at step S9, and the operation ends to repeat the operation of FIG. 10.

This process can also reduce quality degradation of the output voice caused by enhancing, for a relatively long time period, a low noise originating from a location of an infrequently active talker.

Although the example described above has focused upon the use of total Na1 as the criterion for determining whether to set the threshold α to a relatively low value or to a relatively high value, the criterion for the determination may be the total of times during which speeches are simultaneously made at the sound source location and at the most recent recorded location.

Figure 11:
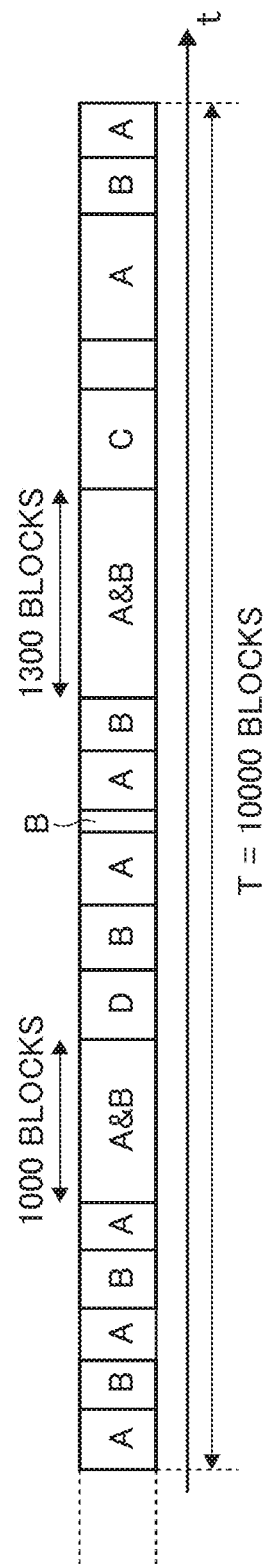
FIG. 11 is a schematic diagram for explaining a third example of talkers' history and talk time sections during the look-back period T.

For example, FIG. 11 illustrates an example in which the total of times during which speeches were simultaneously made at location A, which is the current sound source location, and at location B, which is the most recent recorded location, during the look-back period T is as follows: 1000 blocks+1300 blocks=2300 blocks.

Thus, the enhancer 12a may set the threshold α to a relatively low value if this number of blocks of 2300 reaches or exceeds a predetermined value.

As used herein, block is a unit of time.

The enhancer 12a of a teleconference system according to a third example makes a selection of enhancement non-sound source location if the switching frequency of the sound source location exceeds a threshold, or reaches or exceeds the threshold, and a significant difference exists in the numbers of recorded state changes Na of the respective locations.

A switching frequency of the sound source location not exceeding a threshold, or not reaching nor exceeding the threshold is thought to be indicative of a less concentrated discussion, which may create a relatively long silent period upon switching between talkers. Such silent period is likely to lead to a recognition that no current sound source location exists in that silent period.

In such case, no selection is made of an enhancement non-sound source location to avoid sound enhancement of all the locations so that voice of the next talker can be effectively and beneficially collected from the very beginning of a speech.

Meanwhile, if there is no significant difference in the switching frequencies of the respective locations, such condition is thought to be indicative of most of the participants having almost equally opportunities of speaking. Therefore, even in a relatively concentrated discussion, selection of the locations of all these talkers as enhancement non-sound source locations should result in an increase in noise introduction.

The teleconference system according to the third example employs a total Na2, which is the total of the numbers of recorded state changes Na of the respective locations during the look-back period T, as a measure of the switching frequency between sound source locations.

More specifically, selection of the enhancement non-sound source location is made if the total Na2 exceeds a threshold $\gamma$, or reaches or exceeds the threshold $\gamma$, and a significant difference exists in the numbers of recorded state changes Na of the respective locations.

The criterion of the selection described above is that the location having the highest number of recorded state changes Na be selected from the set of locations excluding the current sound source location (hereinafter referred to as "non-sound source location set").

Whether a significant difference exists in the numbers of recorded state changes Na is determined based on a difference between the maximum value of the numbers of recorded state changes Na in the non-sound source location set and the average of the numbers of recorded state changes Na of all the locations (this difference is hereinafter referred to as "significant difference determination value" X).

More specifically, when the significant difference determination value X is less than a predetermined value, or is equal to or less than the predetermined value, it is determined that no significant difference exists.

Table 2 below shows an example of the numbers of recorded state changes Na of the respective locations during the look-back period T.

TABLE 2

| Location | Location A | Location B | Location C | Location D | |
|---|---|---|---|---|---|
| Number of State Changes Na | 4 | 2 | 1 | 0 | Total Na2 = 7 |

Table 2 shows that the value of total Na2 is 7.

Assuming that this value of 7 exceeds the threshold $\gamma$, or reaches or exceeds the threshold $\gamma$, and if the current sound source location is at location B, the location having the highest number of recorded state changes Na is location A in the non-sound source location set (location A, location C, and location D).

Since the average of the numbers of recorded state changes Na of the respective locations is 1.75 (=7/4), the significant difference determination value X, which is the difference between the number of recorded state changes Na of location A (=4) and the average (−1.75), is 2.25.

Table 3 below shows a second example of the numbers of recorded state changes Na of the respective locations during the look-back period T.

TABLE 3

| Location | Location A | Location B | Location C | Location D | |
|---|---|---|---|---|---|
| Number of State Changes Na | 4 | 2 | 1 | 0 | Total Na2 = 7 |

Table 3 shows that the numbers of recorded state changes Na of the respective locations differ by smaller amounts than the differences illustrated in Table 2.

However, the value of the total Na2 is 7, which is identical to the value in Table 2.

Assuming that this value of 7 exceeds the threshold $\gamma$, or reaches or exceeds the threshold $\gamma$, and if the current sound source location is at location B, location A and location C are each the location having a highest number of recorded state changes Na in the non-sound source location set (location A, location C, and location D).

Since the average of the numbers of recorded state changes Na of the respective locations is 1.75 (=7/4), the significant difference determination value X, which is the difference between the number of recorded state changes Na (=2) of location A and location C, and the average (=1.75), is 0.25.

This is a relatively low value, and is likely to be less than the predetermined value, or be equal to or less than the predetermined value, thereby causing no enhancement non-sound source location to be selected.

Figure 12:
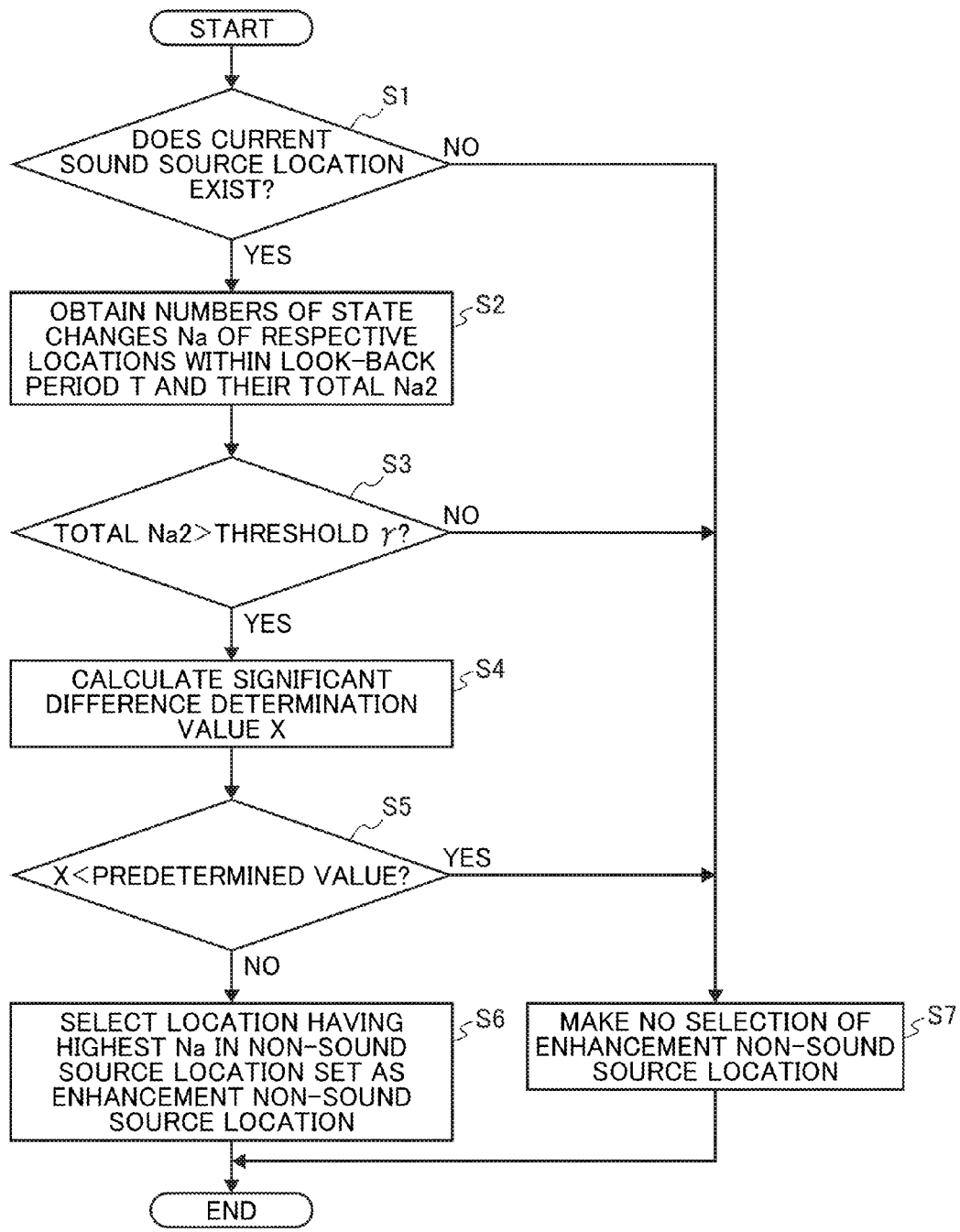
FIG. 12 is a flowchart of a process performed by an enhancer of a teleconference system according to a third example.

FIG. 12 is a flowchart of a process performed by the enhancer 12a of the teleconference system according to the third example.

Referring to this flowchart, at step S1, the enhancer 12a determines whether a current sound source location exists.

If no current sound source location exists (N at step S1), no selection is made of the enhancement non-sound source location at step S7, and the process returns to S1.

This procedure ensures that sound from none of the plurality of locations is enhanced, and that all the locations have voice levels substantially identical to one another, thereby enabling voice of the next talker to be effectively and beneficially collected Meanwhile, if a current sound source location exists (Y at step S1), the enhancer 12a obtains, at step S2, the numbers of recorded state changes Na of the respective locations within the look-back period T, and the total Na2 of these Na.

At step S3, it is determined whether the value of the total Na2 exceeds a threshold $\gamma$. If the total Na2 does not exceed the threshold $\gamma$ (N at step S3), no selection is made of the enhancement non-sound source location at step S7, and the process returns to step S1.

This process enhances only the sound from the sound source location.

This is a case of a less lively discussion, in which some time of silent period is likely to exist, causing sound enhancement to be interrupted for all the locations, after the current talker has stopped speaking and before a next talker starts speaking.

Thus, it is unlikely that the voice in an initial portion of speech of a next talker will be unclear even if no selection is made of the enhancement non-sound source location.

Meanwhile, if the value of the total Na2 exceeds the threshold $\gamma$ (Y at step S3), the enhancer 12a calculates, at step S4, the significant difference determination value X described above. At step S5, it is determined whether the value of X is less than a predetermined value.

If the value of X is not less than the predetermined value (N at step S5), it is determined that a significant difference exists in the frequencies of speech of the participants, and at step S6, the location having the highest number of recorded state changes Na in the non-sound source location set is identified as the enhancement non-sound source location. Then, the process returns to step S1.

On the contrary, if the value of X is less than the predetermined value (Y at step S5), it is determined that no significant difference exists in the frequencies of speech of the participants, and at step S7, no selection is made of the enhancement non-sound source location, and the process returns to step S1.

This process can also reduce quality degradation of the output voice caused by enhancing, for a relatively long time period, a low noise originating from a location of an infrequently active talker.

In one variation, the threshold γ may be selectively set to either a relatively low value or a relatively high value based on a predetermined criterion similarly to the case of the threshold α used in the teleconference system according to the second example.

The enhancer 12a of a teleconference system according to a fourth example also makes a selection of enhancement non-sound source location, similarly to the case of the third example, if the switching frequency of the sound source location exceeds a threshold, or reaches or exceeds the threshold, and a significant difference exists in the numbers of recorded state changes Na of the respective locations.

In this regard, the total Na2, which is the total of the numbers of recorded state changes Na of the respective locations during the look-back period T, is employed as a measure of the switching frequency between sound source locations.

More specifically, selection of a enhancement non-sound source location is made if the total Na2 exceeds a threshold γ, or reaches or exceeds the threshold γ, and a significant difference exists in the numbers of recorded state changes Na of the respective locations.

The criterion of the selection described above is that a location having a number of recorded state changes Na exceeding a threshold, or reaching or exceeding the threshold be selected from the set of locations excluding the current sound source location (hereinafter referred to as "non-sound source location set").

This process can also reduce quality degradation of the output voice caused by enhancing, for a relatively long time period, a low noise originating from a location of an infrequently active talker.

In addition, increase in noise introduction due to specifying many locations as enhancement non-sound source locations can also be prevented.

In one variation, the threshold described above may be selectively set to either a relatively low value or a relatively high value based on a predetermined criterion similarly to the case of the threshold α used in the teleconference system according to the second example.

A second embodiment of a teleconference system in which the present invention is practiced will next be described.

The basic configuration of the teleconference system according to the second embodiment is similar to the basic configuration of the teleconference system according to the first embodiment, and the explanation thereof will thus be omitted.

The enhancer 12a of the teleconference system according to the second embodiment discontinues the process of enhancing the sound from the sound source location when the switching frequency of the sound source location during the look-back period T exceeds a threshold, or reaches or exceeds the threshold.

Figure 13:
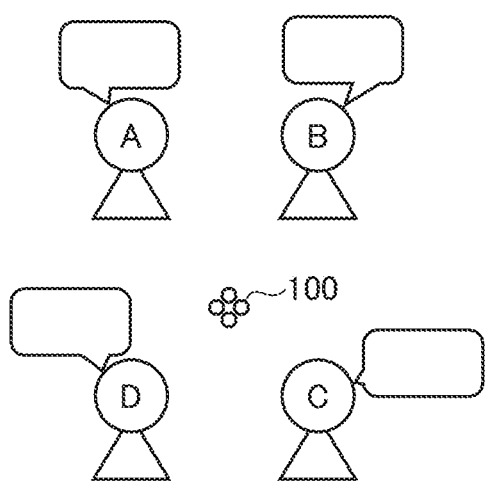
FIG. 13 is a schematic diagram illustrating a situation of the local meeting room in which enhancement of the sound from the sound source location has been discontinued.

As illustrated in FIG. 13, this process prevents enhancement of the sounds from all of the locations, and thus provides similar levels of output intensity for the sounds from the respective locations.

This process outputs the sound from a new sound source location switched from a non-sound source location, at a substantially same level as the levels of the sounds from the other locations, thereby preventing unclear voice from occurring in an initial portion of speech immediately after the switch between talkers.

Figure 14:
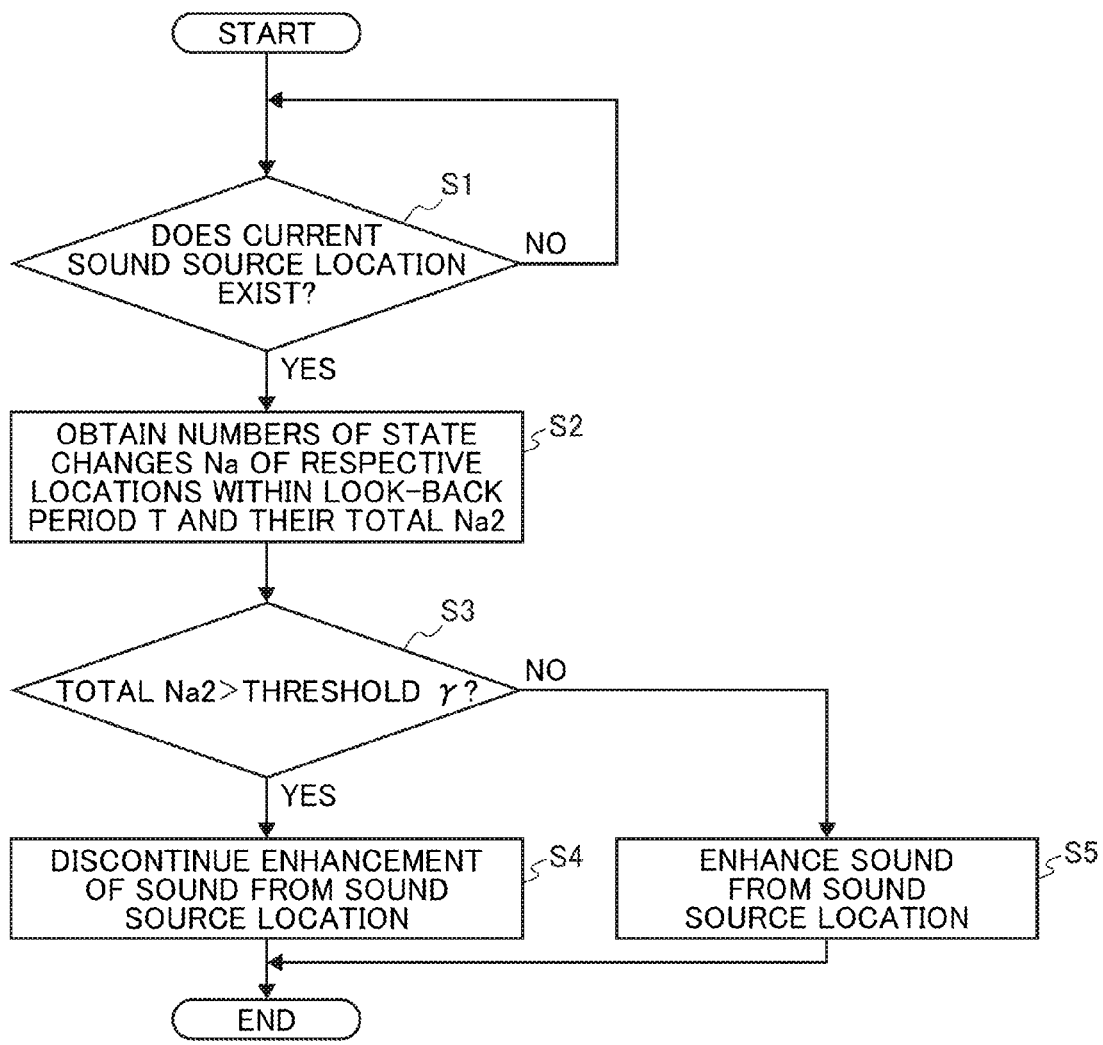
FIG. 14 is a flowchart of a process performed by an enhancer of a teleconference system according to a second embodiment.

FIG. 14 is a flowchart of a process performed by the enhancer 12a.

Referring to this flowchart, at step S1, the enhancer 12a determines whether a current sound source location exists.

If no current sound source location exists (N at step S1), sound from none of the locations is enhanced continuously, and the process returns to S1.

If a current sound source location exists (Y at step S1), the enhancer 12a obtains, at step S2, the numbers of recorded state changes Na of the respective locations within the look-back period T, and the total Na2 of these Na.

At step S3, it is determined whether the value of the total Na2 exceeds a threshold γ. If the total Na2 does not exceed the threshold γ (N at step S3), the process of enhancing the sound from the sound source location is continued at step S5, and the process returns to S1.

Meanwhile, if the total Na2 exceeds the threshold γ (Y at step S3), enhancement of the sound from the sound source location is discontinued at step S4, and the process returns to S1.

In one variation, the threshold γ may be selectively set to either a relatively low value or a relatively high value based on a predetermined criterion similarly to the case of the threshold α used in the teleconference system according to the second example.

The voice processing device of one or a plurality of the embodiments described above enables a sound to be enhanced, the sound from a location that is recorded as the sound source location in a past predetermined time period among a plurality of locations, even if that location is not currently identified as the sound source location by the location identifier.

This configuration ensures that a sound from a location recorded as the sound source location is enhanced and then output even immediately after a switch from a non-sound source location to the sound source location.

Thus, unclear sound immediately after a switch from a non-sound source location to a new sound source location can be prevented if the new sound source location is recorded as the sound source location in a past predetermined time period.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A voice processing device comprising:
   a sound pickup to receive sounds respectively from a plurality of locations; and
   circuitry to:
      identify, from the plurality of locations, a sound source location at which a sound source exists, as a current sound source location;

specify at least one location of the plurality of locations other than the current sound source location, from at least one sound source location that has been identified as the sound source location during a past predetermined time period but not as the current sound source location, as a specified source location;

enhance a sound from the current sound source location, and a sound from the specified source location; and output an audio signal including the enhanced sounds.

2. The voice processing device according to claim 1, wherein
the circuitry specifies, as the specified source location, a location that has been changed from a state not being the sound source location to the sound source location during the predetermined time period for at least a number of times reaching a predetermined threshold.

3. The voice processing device according to claim 1, wherein, when the sound source location has changed only between the current sound source location, and a previously identified sound source location that has been identified just before the current sound source location, for at least a number of times reaching a predetermined threshold,
the circuitry specifies the previously identified sound source location as the specified source location.

4. The voice processing device according to claim 1, wherein
when a frequency of switches of the sound source location reaches a predetermined threshold,
the circuitry specifies, from among the plurality of locations other than the current sound source location, at least one location having a highest number of state changes, as the specified source location,
the number of state changes representing a number of changes from a state not being the sound source location to the sound source location during the predetermined time period.

5. The voice processing device according to claim 4, wherein
when a difference between the number of state changes of the at least one location having the highest number of state changes, and an average of the numbers of state changes of all the locations is equal to or less than a predetermined threshold, the circuitry enhances no sounds from the plurality of locations.

6. The voice processing device according to claim 1, wherein
when a frequency of switches of the sound source location reaches a predetermined threshold,
the circuitry specifies, from among the plurality of locations other than the current sound source location, at least one location having a number of state changes reaching the predetermined threshold, as the specified source location.

7. The voice processing device according to claim 1, further comprising:
a communication device configured to communicate with an external device via a communication line.

8. An audio and video output apparatus comprising:
a video processing device configured to process an image signal for output; and
the voice processing device according to claim 1, configured to process an audio signal.

9. The audio and video output apparatus according to claim 8, further comprising:
a communication device configured to communicate with an external device via a communication line.

10. A communication system comprising:
a plurality of audio and video output apparatuses provided in a plurality of locations, and configured to receive and transmit sound and video from and to one another via a communication line,
wherein at least one of the plurality of audio and video output apparatuses is the audio and video output apparatus according to claim 9.

11. A voice processing device comprising:
a sound pickup to receive sounds respectively from a plurality of locations; and
circuitry configured to:
identify, from the plurality of locations, a sound source location at which a sound source exists; and
enhance a sound from the identified sound source location to output an audio signal including the enhanced sound,
wherein the circuitry discontinues a process of enhancing a sound from the identified sound source location, in accordance with a frequency of switches of the sound source location between two or more of the plurality of locations.

12. The voice processing device according to claim 11, wherein the circuitry discontinues the process of enhancing a sound from the identified sound source location, when the frequency of switches of the sound source location between two or more of the plurality of locations within a past predetermined time period reaches a predetermined threshold.

13. A method of processing sounds, comprising:
receiving sounds respectively from a plurality of locations;
identifying, from the plurality of locations, a sound source location at which a sound source exists, as a current sound source location;
specifying at least one location of the plurality of locations other than the current sound source location, from at least one sound source location that has been identified as the sound source location during a past predetermined time period, as a specified source location at which a sound to be enhanced exists;
enhancing a sound from the current sound source location, and a sound from the specified source location; and
outputting an audio signal including the enhanced sounds.

* * * * *